(12) United States Patent
Rutkiewicz et al.

(10) Patent No.: US 10,818,024 B2
(45) Date of Patent: Oct. 27, 2020

(54) RANGING OBJECTS EXTERNAL TO AN AIRCRAFT USING MULTI-CAMERA TRIANGULATION

(71) Applicant: Simmonds Precision Products, Inc., Vergennes, VT (US)

(72) Inventors: Robert Rutkiewicz, Edina, MN (US); Todd Anthony Ell, Savage, MN (US); Joseph T. Pesik, Eagan, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 110 days.

(21) Appl. No.: 15/936,089

(22) Filed: Mar. 26, 2018

(65) Prior Publication Data
US 2019/0295274 A1    Sep. 26, 2019

(51) Int. Cl.
*G06T 7/55*    (2017.01)
*G06T 7/73*    (2017.01)
(Continued)

(52) U.S. Cl.
CPC ............... *G06T 7/55* (2017.01); *B64D 45/00* (2013.01); *B64F 1/002* (2013.01); *G01B 11/245* (2013.01);
(Continued)

(58) Field of Classification Search
None
See application file for complete search history.

(56) References Cited

U.S. PATENT DOCUMENTS 6,405,975 B1    6/2002    Sankrithi et al.
6,571,166 B1    5/2003    Johnson et al.
(Continued)

FOREIGN PATENT DOCUMENTS

CA    2464791 A1    10/2004
CA    2737189 A1    10/2011
(Continued)

OTHER PUBLICATIONS

Extended European Search Report dated Jul. 5, 2019, received for corresponding European Application No. 19164871.6.
(Continued)

*Primary Examiner* — Vu Le
*Assistant Examiner* — Tracy Mangialaschi
(74) *Attorney, Agent, or Firm* — Kinney & Lange, P.A.

(57) ABSTRACT

Apparatus and associated methods relate to ranging an object nearby an aircraft by triangulation using two simultaneously-captured images of the object. The two images are simultaneously captured from two distinct vantage points on the aircraft. Because the two images are captured from distinct vantage points, the object can be imaged at different pixel-coordinate locations in the two images. The two images are correlated with one another so as to determine the pixel-coordinate locations corresponding to the object. Range to the object is calculated based on the determined pixel-coordinate locations and the two vantage points from which the two images are captured. Only a subset of each image is used for the correlation. The subset used for correlation includes pixel data from pixels upon which spatially-patterned light that is projected onto the object by a light projector and reflected by the object.

20 Claims, 12 Drawing Sheets

(51) Int. Cl.
| | |
|---|---|
| G06T 7/521 | (2017.01) |
| G08G 5/04 | (2006.01) |
| G08G 5/06 | (2006.01) |
| G01B 11/245 | (2006.01) |
| G08G 5/00 | (2006.01) |
| G06K 9/00 | (2006.01) |
| G06K 9/20 | (2006.01) |
| B64F 1/00 | (2006.01) |
| G01B 11/25 | (2006.01) |
| G06T 7/593 | (2017.01) |
| B64D 45/00 | (2006.01) |
| G01S 17/48 | (2006.01) |
| G01S 17/931 | (2020.01) |

(52) U.S. Cl.
CPC .......... *G01B 11/2545* (2013.01); *G01S 17/48* (2013.01); *G01S 17/931* (2020.01); *G06K 9/00805* (2013.01); *G06K 9/2027* (2013.01); *G06K 9/2036* (2013.01); *G06T 7/521* (2017.01); *G06T 7/593* (2017.01); *G06T 7/74* (2017.01); *G08G 5/0021* (2013.01); *G08G 5/045* (2013.01); *G08G 5/065* (2013.01); *G06T 2207/10021* (2013.01); *G06T 2207/30252* (2013.01); *G08G 5/0078* (2013.01)

(56) References Cited

U.S. PATENT DOCUMENTS

| | | | |
|---|---|---|---|
| 7,592,929 | B2 | 9/2009 | Pepitone |
| 7,974,773 | B1 | 7/2011 | Krenz et al. |
| 9,047,771 | B1 | 6/2015 | Thoreen et al. |
| 9,174,746 | B1 | 11/2015 | Bell et al. |
| 9,245,450 | B1 | 1/2016 | Chiew et al. |
| 9,401,094 | B2 | 7/2016 | Cros et al. |
| 2003/0123707 | A1* | 7/2003 | Park ................. G01B 11/2513 382/106 |
| 2006/0072914 | A1* | 4/2006 | Arai ..................... G01S 17/931 396/106 |
| 2007/0241936 | A1 | 10/2007 | Arthur et al. |
| 2010/0094487 | A1 | 4/2010 | Brinkman |
| 2014/0092206 | A1 | 4/2014 | Boucourt et al. |
| 2014/0198976 | A1* | 7/2014 | Coffman ............... G06T 7/593 382/154 |
| 2015/0142214 | A1 | 5/2015 | Cox et al. |
| 2016/0034771 | A1* | 2/2016 | Schamp ............ G01B 11/2545 348/148 |
| 2016/0288330 | A1* | 10/2016 | Konolige .............. H04N 13/239 |
| 2016/0350929 | A1* | 12/2016 | Tubic .................... G06T 7/521 |
| 2017/0201738 | A1 | 7/2017 | Lacaze et al. |
| 2017/0301250 | A1 | 10/2017 | Ell et al. |
| 2017/0334578 | A1 | 11/2017 | Fleck et al. |
| 2018/0156606 | A1* | 6/2018 | Jeon ..................... G01B 11/02 |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2426461 A2 | 3/2012 |
| EP | 2495168 A1 | 9/2012 |
| EP | 2565861 A2 | 3/2013 |
| EP | 2685442 A2 | 1/2014 |
| WO | 2009010969 A2 | 1/2009 |
| WO | 2016200096 A1 | 12/2016 |

OTHER PUBLICATIONS

International Civil Aviation Organization, "Aerodrome Standards: Aerodrome Design and Operations", ICAO: Cooperative Development of Operational Safety and Continuing Airworthiness, dated Jul. 1999, 194 pages.

International Civil Aviation Organization, "Airport Markings: ICAO & U.S. Requirements", ICAO: Federal Aviation Administration, dated Jun. 2012, 19 pages.

U.S. Department of Transporation, "Advisory Circular", U.S. DOT: Federal Aviation Administration, dated Sep. 27, 2013, 144 pages.

Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.

Federal Aviation Administration, "A Quick Reference to Airfield Standards", FAA: Southern Region Airports Division, dated Jan. 2018, 69 pages.

* cited by examiner

RANGING OBJECTS EXTERNAL TO AN AIRCRAFT USING MULTI-CAMERA TRIANGULATION

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions with sufficient range and measurement resolution in a potential collision path, and to provide visual and audible alerts to the cockpit.

SUMMARY

Apparatus and associated methods relate to a system for ranging an object in a scene. The system includes a light projector configured to be mounted at a projector location. The light projector also is configured to project spatially-patterned light onto the scene, thereby illuminating a spatially-patterned portion of the scene including a spatially-patterned portion of the object in the scene. The system includes first and second cameras configured to be mounted at first and second distinct camera locations. The first and second cameras are further configured to simultaneously capture, when the spatially-patterned light is projected onto the scene, first and second images of the scene from the first and second distinct camera locations, respectively, thereby focusing the spatially-patterned portion of the object onto pixel(s) having first pixel coordinates in the first image and onto pixel(s) having second pixel coordinates in the second image. The system includes an image processor configured to identify first and second regions of the first and second images, onto which the spatially-patterned light is focused, respectively. The image processor is further configured to correlate the identified first and second regions with one another so as to determine the first and second pixel coordinates corresponding to the spatially-patterned portion of the object. The system also includes a range calculator configured to calculate range to the object using triangulation based on the determined first and second pixel-coordinates and the first and second distinct camera locations from which the first and second images are simultaneously captured.

Some embodiments relate to a method for ranging an object in a scene. The method includes projecting spatially-patterned light onto the scene, thereby illuminating a spatially-patterned portion of the scene including a spatially-patterned portion of the object in the scene. Then, two images of the scene from two distinct vantage points are simultaneously captured when the spatially-patterned light is projected upon the scene, thereby imaging the spatially-patterned portion of the object at first pixel coordinates in a first of the two images and at second pixel coordinates in a second of the two images. The first and second regions upon which the spatially-patterned light is imaged in the first and second images, respectively are identified. The first and second regions are correlated with one another so as to determine the first and second pixel coordinates corresponding to the spatially-patterned portion of the object. Range to the object is calculated using triangulation based on the determined first and second pixel-coordinates and the two distinct vantage points from which the two images are simultaneously captured. An output signal indicative of the calculated range is then generated.

Some embodiments relate to a system for ranging an object in a scene. The system includes a light projector configured to be mounted at a projector location. The light projector is further configured to project spatially-patterned light onto the scene, thereby illuminating a spatially-patterned portion of the scene including a spatially-patterned portion of the object in the scene. The system includes first and second cameras configured to be mounted at first and second distinct camera locations. The first and second cameras are further configured to simultaneously capture, when the spatially-patterned light is projected onto the scene, first and second images of the scene from the first and second distinct camera locations, respectively, thereby imaging the spatially-patterned portion of the object at first pixel coordinates in the first image and at second pixel coordinates in the second image. The system includes one or more processors and computer-readable memory. The computer-readable memory is encoded with instructions that, when executed by the one or more processors, cause the system to identify first and second regions upon which the spatially-patterned light is imaged in the first and second images, respectively. The computer-readable memory is further encoded with instructions that, when executed by the one or more processors, cause the system to correlate the first and second regions with one another so as to determine the first and second pixel coordinates corresponding to the spatially-patterned portion of the object. The computer-readable memory is further encoded with instructions that, when executed by the one or more processors, cause the system to calculate range to the object using triangulation based on the determined first and second pixel-coordinates and the two distinct vantage points from which the two images are simultaneously captured.

DETAILED DESCRIPTION

Apparatus and associated methods relate to ranging an object nearby an aircraft by triangulation using two simultaneously-captured images of the object. The two images are simultaneously captured from two distinct vantage points on the aircraft. Because the two images are captured from distinct vantage points, the object can be imaged at different pixel-coordinate locations in the two images. The two images are correlated with one another to determine the pixel-coordinate locations corresponding to the object. Range to the object is calculated based on the determined pixel-coordinate locations and the two vantage points from which the two images are captured. To reduce processing requirements, only a subset of each image is used for the correlation. The subset of each image used for correlation includes pixel data from pixels upon which spatially-patterned light that is projected onto the object by a light projector and reflected by the object.

In some embodiments, images of the object are captured both with and without illumination by the spatially-patterned light. A difference between these two images can be used to help isolate the reflections of the spatially-patterned light. The two images can also be used in tandem to identify pixel boundaries of the object and to calculate range values of portions of the object corresponding to pixels imaging these portions. For pixels imaging reflections of the spatially-patterned light, triangulation can be used to calculate range. For pixels not imaging reflections of the spatially-patterned light, range can be calculated using one or more calculated ranges corresponding to nearby pixels imaging the spatially-patterned light reflected from the object. Using these two ranging techniques provides pixel level resolution of location values, while requiring only sparse illumination of objects by spatially-patterned light.

Figure 1:
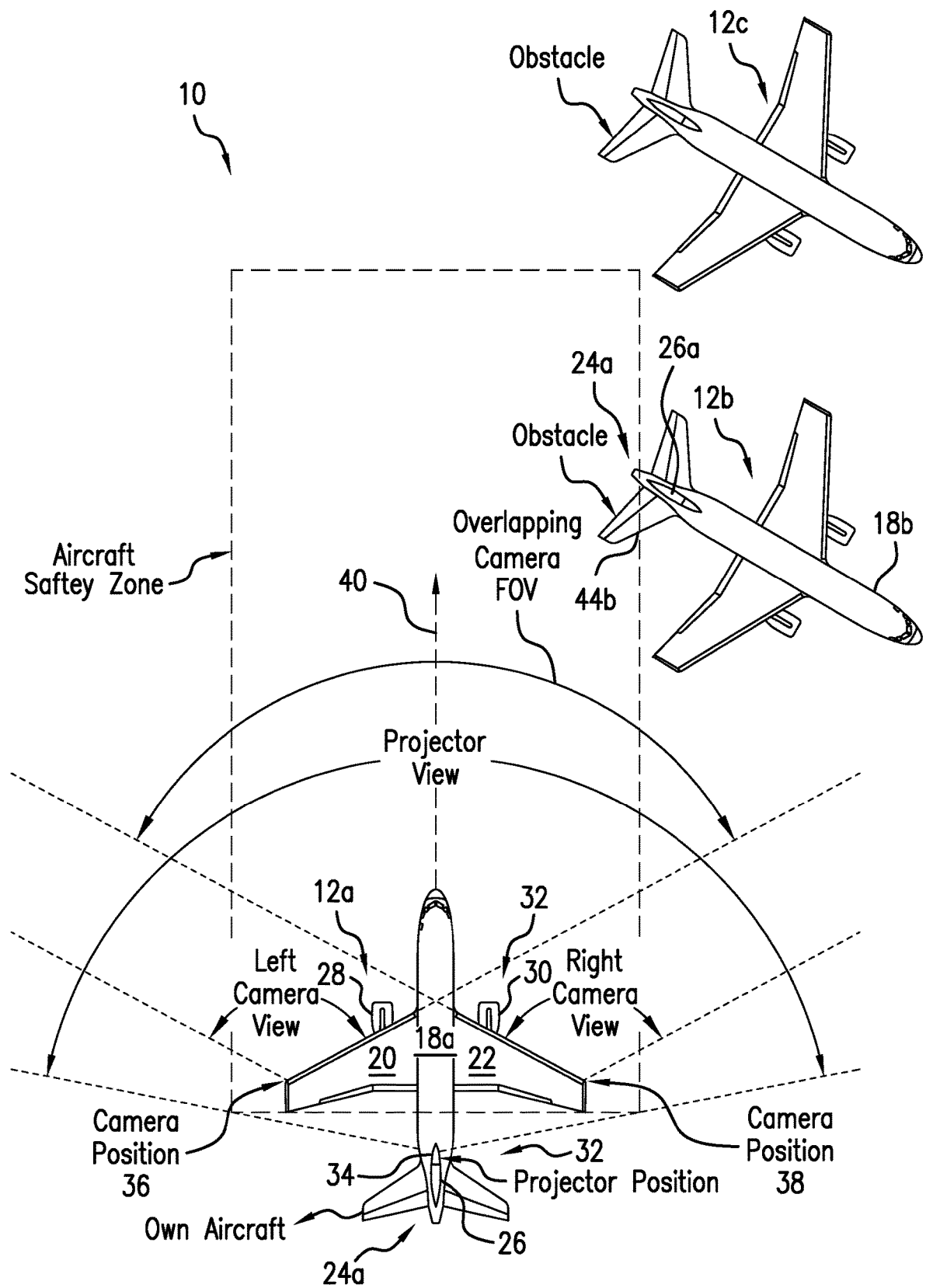
FIG. 1 is a schematic view of an exemplary object ranging system used by an aircraft during on-ground operations.

FIG. 1 is a schematic view of an exemplary object ranging system used by an aircraft during on-ground operations. In FIG. 1, aircraft taxi scenario 10 includes taxiing aircraft 12a and two parked aircraft 12b and 12c. Taxiing aircraft 12a has fuselage 18a, left wing 20, right wing 22 and tail 24a. Tail 24a has vertical stabilizer 26a. Left engine 28 hangs from left wing 20, and right engine 30 hangs from right wing 22. Taxiing aircraft 12a is equipped with one embodiment of object ranging system 32. Object ranging system 32 includes light projector 34, left-side camera 36, and right-side camera 38. In the depicted embodiment, light projector 34 is mounted on vertical stabilizer 26a of tail 24a. Light projector 34 is configured to project spatially-patterned light onto a scene external to taxiing aircraft 12a, thereby illuminating a spatially-patterned portion of the scene including spatially-patterned portions of objects in the scene. Light projector 34 can be mounted at various other locations on taxiing aircraft 12a. Left- and right-side cameras 36 and 38 can also be mounted at various locations on taxiing aircraft. For example, cameras 36 and 38 need not be on left- and right-hand sides of aircraft 12a.

In the depicted embodiment, the fields of view for light projector 34, and left- and right-side cameras 36 and 38 have fields of view that overlap one another. Such a configuration of fields of view permit left- and right-side cameras 36 and 38 to simultaneously capture images containing the spatially-patterned light projected by light projector 34 and reflected by the scene. In some embodiments, left- and right-side cameras 36 and 38 can be coordinated so as to both zoom in on a portion of the scene so as to be able to simultaneously capture imagery of that zoomed-in portion of the scene.

Light projector 34 projects the spatially-patterned light over a solid angle of illumination. The spatially-patterned light can be used to illuminate objects that reside within the solid angle of illumination. In the depicted embodiment, light projector 34 has an optical axis that is coplanar with fuselage axis 40 of taxiing aircraft 12a. Light projector 34 is shown illuminating objects that are within an azimuthal range of +/−85 degrees of fuselage axis 40 of taxiing aircraft 12a, and within an elevation range of a projection horizon of light projector 34. The elevation range of projection, for example, can be from about +3, +5, +10, +12, or +15 degrees to about −2, −5, −8, or −10 degrees of projection from a vertical location of light projector 34. In some embodiments, the solid angle of projection encompasses the wingtips of left wing 20 and right wing 22, as well as a plane extending forward of these wingtips parallel to fuselage axis 40.

In some embodiments, the spatially-patterned light can continuously illuminate objects within the solid angle of illumination. In other embodiments, the spatially-patterned light can intermittently illuminate objects within the solid angle of illumination. Such illumination may use light of various wavelengths. For example, in some embodiments, infrared light, being invisible to humans, can be used to provide illumination of objects within the solid angle of illumination. Infrared light can advantageously be non-distractive to pilots and to other people upon whom the spatially-patterned light is projected.

In some embodiments, the spatially-patterned light is projected for a limited time, with image capture synchronized with the projector illumination. Shorter image capture durations can reduce the light captured from solar illumination, lowering the projector power needed. In some embodiments, the image captures only changes in light level with optimal capture at specific frequencies of light intensity variation. The projector generates a high speed variation in light intensity that matches the frequency at which the image capture is most sensitive. In some embodiments, the image capture is sensitive to the total amount of light captured.

In some embodiments, light having wavelengths within an atmospheric absorption band can be used. Careful selection of projector wavelength can permit the projector to compete less with the solar energy. There are, however, certain wavelengths where the atmospheric absorption is so great that both projector energy and solar energy are attenuated equally. White light is broadband such as the light emitted from the sun. Solar light has a maximum intensity falling in the visible light spectrum. The portion of sunlight that has wavelengths within the infrared spectrum is of lower intensity than the portion that has wavelengths in the visible band. And so, projected light having such infrared wavelengths need not compete as strongly with the sunlight. Using light having such infrared wavelengths can thereby permit reduced power levels in projecting spatially-patterned light. Atmospheric absorption bands may further reduce solar infrared illumination. For example, atmospheric absorption bands include infrared wavelengths of between about 1.35-1.4, 1.8-1.95, 2.5-2.9, and between 5.5-7.2 microns.

In some embodiments, the spatially-patterned light that is projected by light projector 34 has particular patterns or features that can be identified in images formed by cameras 36, 38. Using knowledge of the location of the cameras 36, 38 and the image regions within the two camera's images (e.g., pixel coordinates) corresponding to pixels upon which the particular pattern or feature is imaged can permit determination of a specific location of the object reflecting such a particular feature (e.g., using triangulation). For example, cameras 36 and 38 can be located on left- and right-hand wingtips of taxiing aircraft 12a, and an image feature reflecting off of parked aircraft 12b can be focused on first pixel coordinates of the image captured by left-side camera 36 and focused on second pixel coordinates of the image captured by right-side camera 38. These pixel coordinates can be related to angles with respect to fuselage axis 40 that the image feature ray traces from the object (e.g., parked aircraft 16) to the cameras 36 and 38.

Light projector 34, for example, can project spatially-patterned light that includes a pattern of horizontal lines projecting at various angles of elevation from light projector 34. One horizontal line might be projected at an angle of elevation of zero degrees (i.e., directed parallel to the horizon). A second horizontal line might be projected at an angle of negative five degrees from the horizon (i.e., directed at a slightly downward angle from light projector 34). Each of these projected horizontal lines of light, when reflected from an object, will be imaged at a different vertical location (e.g., each will have a different vertical pixel coordinate) within the camera image, depending on the range distance between the reflecting object and taxiing aircraft 12a. Knowing the elevation of light projector 34, the elevations of cameras 36, 38, the specific feature of the spatially-patterned light (e.g., which horizontal line is imaged), and the location within the camera image where the specific feature is imaged can permit a determination of the location of the object from which the specific feature has been reflected.

Using the calculated location information, pilots who are taxiing aircraft 12a can be informed of any potential collision hazards within the scene illuminated by light projector 34. Pilots of taxiing aircraft 34 can steer aircraft 34 to avoid wingtip collisions and/or engine collisions based on the location and range information that is calculated by object ranging system 32. Object ranging systems, such as object ranging system 32, can be used for various purposes and in various configurations. Object ranging systems, such as object ranging system 32, can be mounted on various vehicles (e.g., cars, boats, aircraft, etc.) or can be mounted at a fixed location.

Various configurations of object ranging systems that use image data from a single camera to calculate range to an object have been described in the prior art, such as those disclosed by Ell et al., in US Published Application No. 2017-0301250, titled "Method and System for Aircraft Strike Alerting, filed Dec. 20, 2016, the entire specification of which is hereby incorporated by reference. By performing image processing of spatially-patterned light in a one-dimensional fashion, instead of performing image processing of a complete two-dimensional image, processing power can be lowered, processing algorithms can be simplified, and/or processing time can be reduced.

Figure 2A:
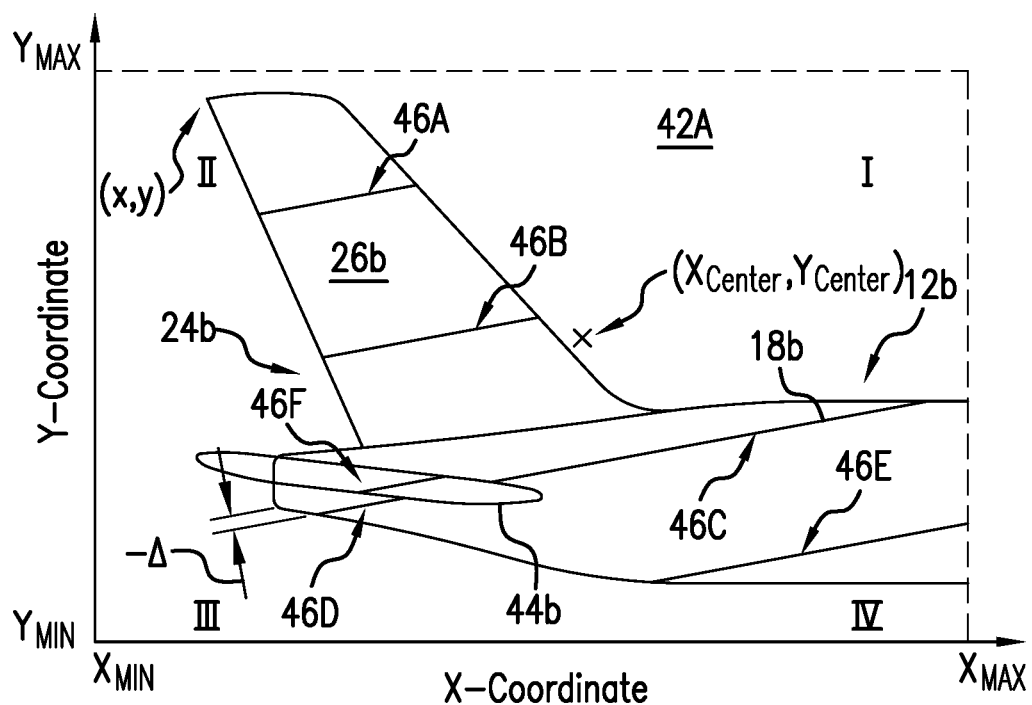
FIGS. 2A-2B are sub-image portions of images or zoomed-in images simultaneously captured by the two cameras located at distinct locations on the aircraft depicted in FIG. 1.
Figure 2B:
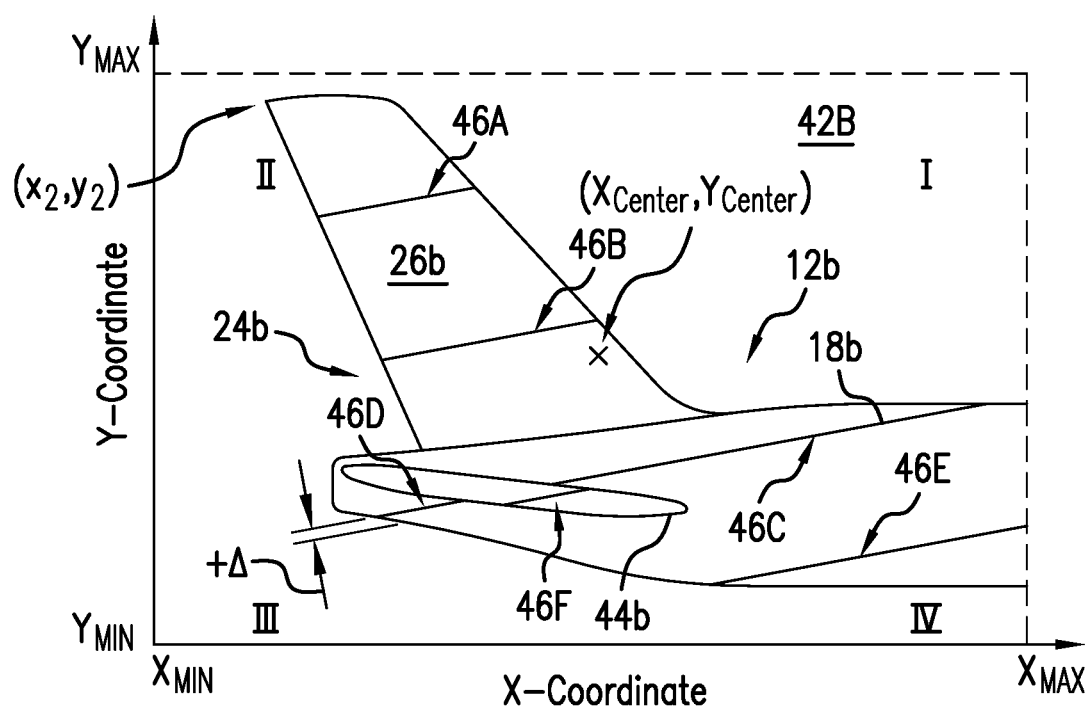

FIGS. 2A-2B are sub-image portions of images or zoomed-in images simultaneously captured by the two cameras located at distinct locations on the aircraft depicted in FIG. 1. In FIG. 2A, first sub-image 42A depicts tail 24b of parked aircraft 12b as captured by right-side camera 38 (as depicted in FIG. 1). First sub-image 42A is depicted in a Cartesian coordinate graph so as to provide pixel coordinates corresponding to various features of tail 24b as captured in first sub-image 42A. Horizontal pixel coordinates are numbered from $x_{MIN}$ to $x_{MAX}$, and vertical pixel coordinates are numbered from $y_{MIN}$ to $y_{MAX}$. A center location of first sub-image 42A is annotated in FIG. 2A as well as the pixel coordinates ($x_{CENTER}$, $y_{CENTER}$). The center pixel coordinates ($x_{CENTER}$, $y_{CENTER}$) of first sub-image 42A can be expressed in terms of $x_{MIN}$, $x_{MAX}$, $y_{MIN}$ and $y_{MAX}$ as follows:

$$(x_{CENTER}, y_{CENTER}) = \left(\frac{x_{MIN} + x_{MAX}}{2}, \frac{y_{MIN} + y_{MAX}}{2}\right)$$

Tail 24b of parked aircraft 12b includes vertical stabilizer 26b and horizontal stabilizer 44b. Spatially-patterned light segments 46A-46F have been projected onto tail 24b. Spatially-patterned light segments 46A-46F include light segments 46A and 46B projected onto vertical stabilizer 26b, light segments 46C-46E projected onto fuselage 18b, and light segment 46F projected onto horizontal stabilizer 44b. Light segments 46C, 46F and 46D were generated by light projector 34 (depicted in FIG. 1) as a single contiguous light segment, but because light projector 34 is mounted to aircraft 12b at a different location than the mounting location of right-side camera 38, from which first sub-image 42A is captured, light segment 46F does not appear contiguous with light segments 46C and 46D. There is a separation distance $-\Delta$ in first sub-image 42A between light segment 46F and light segments 46C and 46D. Separation distance $-\Delta$ is indicative of a range difference between range of horizontal stabilizer 44b and of fuselage 18b.

In FIG. 2B, second sub-image 42B depicts the portion of the scene containing tail 24b of parked aircraft 12b as captured by left-side camera 36 (as depicted in FIG. 1). Second sub-image 42B is again depicted in a Cartesian coordinate graph so as to provide pixel coordinates corresponding to various features of tail 24b as captured in second sub-image 42B. Horizontal pixel coordinates are again numbered from $x_{MIN}$ to $x_{MAX}$, and vertical pixel coordinates are numbered from $y_{MIN}$ to $y_{MAX}$. A center location of second sub-image 42B is annotated in FIG. 2B as well as the pixel coordinates ($x_{CENTER}$, $y_{CENTER}$).

Tail 24b of parked aircraft 12b includes vertical stabilizer 26b and horizontal stabilizer 44b. Spatially-patterned light segments 46A-46F have been projected onto tail 24b. Spatially-patterned light 46A-46F include light segments 46A and 46B projected onto vertical stabilizer 26b, light segments 46C-46E projected onto fuselage 18b, and light segment 46F projected onto horizontal stabilizer 44b. Light segments 46C, 46F and 46D were generated by light projector 34 (depicted in FIG. 1) as a single contiguous light segment, but because light projector 34 is mounted to aircraft 12b at a different location than the mounting location of left-side camera 36, from which second sub-image 42B was captured, linear segment 46F does not appear contiguous with linear segments 46C and 46D. There is a separation distance $+\Delta$ in second sub-image 42B between linear segment 46F and linear segments 46C and 46D. Separation distance $+\Delta$ is indicative of a range difference between range of horizontal stabilizer 44b and of fuselage 18b.

Not only does the separation distance have different values in images 42A and 42B, but parked aircraft 12b is imaged in different locations in images 42A and 42B. For example, the top left-most corner of vertical stabilizer 26b has pixel coordinates $(x_1, y_1)$ in first sub-image 42A, but has pixel coordinates $(x_2, y_2)$ in second sub-image 42B. Here horizontal pixel coordinate $x_2$ has a value that is much greater than the value of horizontal pixel coordinate $x_1$, which indicates that the top left-most corner of vertical stabilizer 26b has been translated to the right from first sub-image 42A to second sub-image 42B. Each portion of parked aircraft 12b is imaged in both first sub-image 42A and second sub-image 42B, but not necessarily at the same location within the image. Each image location within the image is indicative of an angle with respect to the optical axis of the left- or right-side camera 36 or 38 which captured the sub-image 42A or 42B.

In some embodiments, both right-side camera 38 and left-side camera 36 are mounted on aircraft 12a such that their optical axes are aligned with fuselage axis 40 (e.g., parallel to the fuselage axis). In such embodiments, a center of each sub-images 42A and 42B corresponding to pixel coordinates $(x_{MAX}/2, y_{MAX}/2)$ will correspond to a location of the scene aligned in the direction parallel with fuselage axis 40 directly in front left- and right-side cameras 36 and 38. Each of images 42A and 42B has been divided into quadrants I-IV with respect to the center of the images. Quadrant I of images 42A and 42B includes objects in the scene that are aligned at angles above and right of the optical axis. Quadrant II of images 42A and 42B includes objects in the scene that are aligned at angles above and left of the optical axis. Quadrant III of images 42A and 42B includes objects in the scene that are aligned at angles below and left of the optical axis. Quadrant IV of images 42A and 42B includes objects in the scene that are aligned at angles below and right of the optical axis.

Figure 3A:
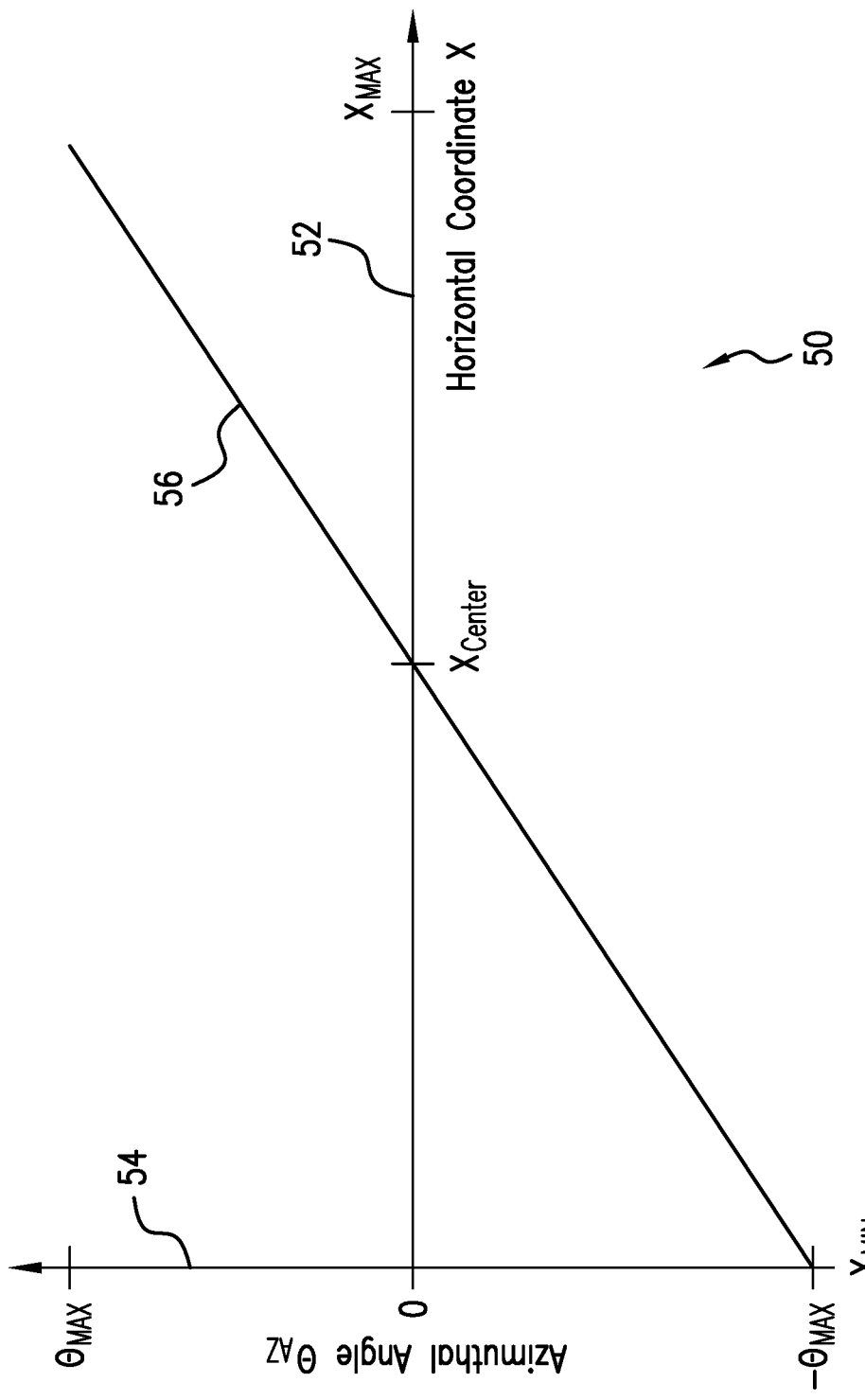
FIGS. 3A-3B are graphs depicting a relation between image coordinates and angle to object imaged at the image coordinates.
Figure 3B:
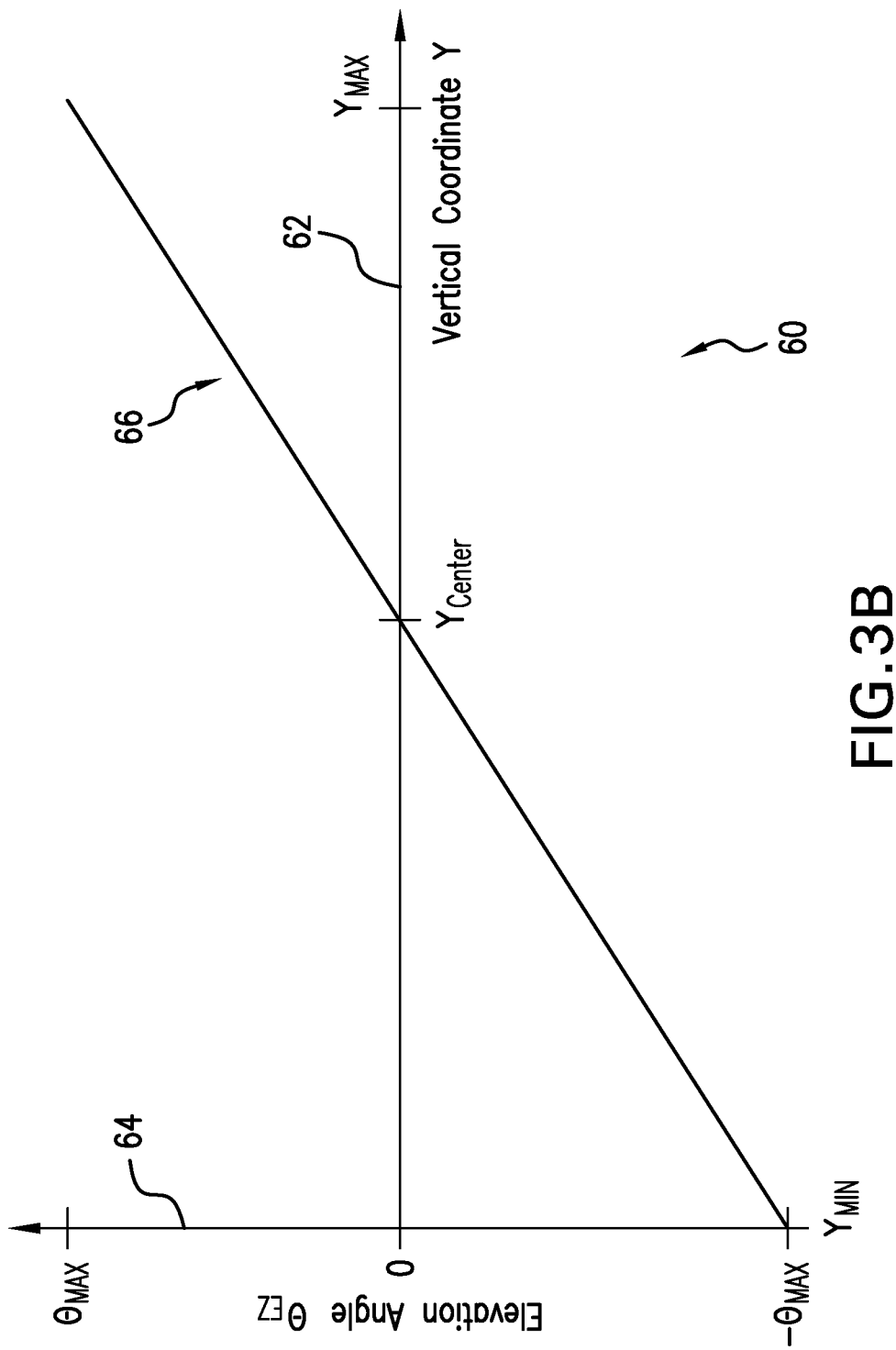

FIGS. 3A-3B are graphs depicting a relation between image coordinates and angle to object imaged at the image coordinates. When an object is captured in an image, its image location is indicative of its relative position with respect to the optical axis. Thus, the pixel-coordinates corresponding to the various image locations can be used to determine the specific angle of objects imaged at such image locations. In FIG. 3A, graph 50 includes horizontal axis 52, vertical axis 54 and azimuthal-angle/horizontal-coordinate relation 56. Horizontal axis 52 is indicative of a horizontal pixel coordinate x corresponding to an imaged object. Vertical axis 54 is indicative of azimuthal angle $\theta_{AZ}$ of the object with respect to the optical axis. Azimuthal-angle/horizontal-coordinate relation 56 indicate the relation between the horizontal coordinate x and the azimuthal angle $\theta_{AZ}$ of whatever object is imaged at an image location corresponding to such a horizontal coordinate x. In azimuthal-angle/horizontal-coordinate relation 56, as horizontal coordinate increases from $x_{MIN}$ to $x_{MAX}$, azimuthal angle increases from $-\theta_{MAX}$ to $+\theta_{MAX}$. At a horizontal center of an image, indicated by horizontal pixel coordinate $x_{CENTER}$, the objects imaged are located at an azimuthal angle $\theta_z$ of 0 with respect to the optical axis.

In FIG. 3B, graph 60 includes vertical axis 62, vertical axis 64 and azimuthal-angle/vertical-coordinate relation 66. Vertical axis 62 is indicative of a vertical pixel coordinate x corresponding to an imaged object. Vertical axis 64 is indicative of elevation angle $\varphi_{EL}$ of the object with respect to the optical axis. Elevation-angle/vertical-coordinate relation 66 indicate the relation between the vertical coordinate x and the elevation angle $\varphi_{EL}$ of whatever object is imaged at an image location corresponding to such a vertical coordinate y. In elevation-angle/vertical-coordinate relation 66, as vertical coordinate increases from $y_{MIN}$ to $y_{MAX}$, elevation angle increases from $-\varphi_{MAX}$ to $-\varphi_{MAX}$. At a vertical center of an image, indicated by vertical pixel coordinate $y_{CENTER}$, the objects imaged are located at an elevation angle $\varphi_{EL}$ of 0 with respect to the optical axis.

Figure 4:
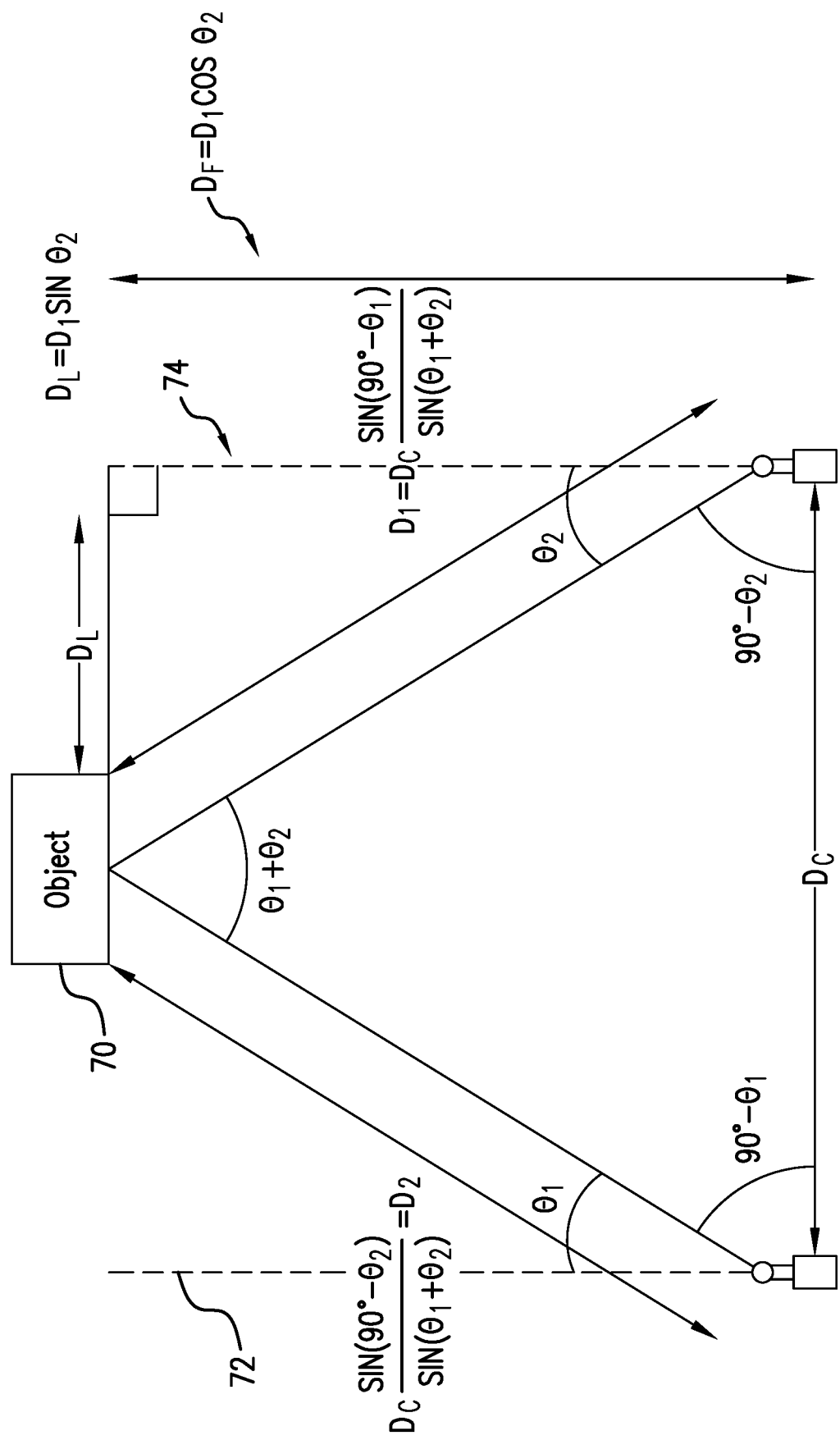
FIG. 4 is a schematic diagram depicting triangulation ranging calculation using image data from simultaneously-captured images.

FIG. 4 is a schematic diagram depicting triangulation ranging using image data from simultaneously-captured images. In FIG. 4, object 70 has been simultaneously captured by left-side camera 36 and right-side camera 38. Left-side camera 36 has optical axis 72, which in the depicted embodiment is parallel to optical axis 74 of right-side camera 38. Based on the a first image location at which object 70 appears in the image captured by left-side camera 36, object 70 is determined to be at angle $\theta_1$, with respect to optical axis 72. Similarly, based on a second image location at which object 70 appears in the image captured by right-side camera 38, object 70 is determined to be at angle $\theta_2$, with respect to optical axis 74.

A triangle has been drawn between each of three vertices corresponding to object 70 and left- and right-side cameras 36 and 38. The triangle segment between vertices corresponding to left- and right-side cameras 36 and 38 is designated $D_C$. Segment $D_C$ is determined by the mounting locations of left- and right-side cameras 36 and 38, and therefore can be known. In the depicted embodiment, left- and right-side cameras 36 and 38 are aligned along a transverse axis that is perpendicular to both of optical axes 72 and 74. Therefore, the interior angle of the vertex corresponding to left-side camera 36 has an angle of $90°-\theta_1$, and the interior angle of the vertex corresponding to right-side camera 38 has an angle of $90°-\theta_2$.

The triangle is determined by this angle-side-angle knowledge. Not only is the triangle determined by knowing these three metrics—angle, side, and angle, but the other vertex angle and the dimension of the other triangle segments can be determined. The sum of interior angles in a triangle is 180°. Therefore, the angle of the vertex corresponding to object 70 is equal to $\theta_1+\theta_2$. Using the law of sines, the dimension of the triangle segment connecting the vertices corresponding to object 70 and left-side camera 36 can be determined to be equal to $D_C*\sin(90°-\theta_1)/\sin(\theta_1+\theta_2)$. Similarly, the dimension of the triangle segment connecting the vertices corresponding to object 70 and left-side camera 36 is given by: $D_C*\sin(90°-\theta_2)/\sin(\theta_1+\theta_2)$.

Each of these calculated triangle segment dimensions contains range information between object 70 and left- and right-side cameras 36 and 38. Each of these triangle segments can be decomposed into two orthogonal components—one in the direction of optical axes 72 and 74 and one in the direction perpendicular to optical axes 72 and 74. For example, the range component of object 70 in the direction of optical axes 72 and 74 can be expressed as either as $D_C*\sin(90°-\theta_1)/\sin(\theta_1+\theta_2)*\sin\theta_2$ or as $D_C*\sin(90°-\theta_2)/\sin(\theta_1+\theta_2)*\cos\theta_1$. Similarly, the transverse range component (i.e., the component in the direction perpendicular to optical axes 72 and 74) of object 70 with respect to left-side camera 36 is given by $D_C*\sin(90°-\theta_2)/\sin(\theta_1+\theta_2)*\sin\theta_1$. Similarly, the transverse range component of object 70 with respect to right-side camera 36 is given by $D_C*\sin(90°-\theta_1)/\sin(\theta_1+\theta_2)*\sin\theta_2$. Thus, if an object can be identified and located within two simultaneously-captured images, and the camera locations and orientations are known, ranging of the object so captured can be determined.

Identifying objects in captured imagery is not always easy, though. In some lighting conditions, objects are difficult to identify, even by humans, much less by machine algorithm. Therefore, artificial illumination is sometimes necessary to ensure that captured images are of adequate quality to identify objects. Even if such artificial illumination is performed, machine algorithms of image identification can be complex, and the data of even a single image is voluminous.

Data can be reduced by illuminating objects in a scene by projecting structured-light onto the scene. For example, a laser can azimuthally sweep across the cameras' fields of view illuminating objects within the fields of view from a left-side to a right-side. The laser can be projected from a light projector at a predetermined elevation with respect to the cameras. The swept beam can be maintained at a constant angle of elevation with respect to a level plane, such as a ground surface, for example. Such a swept beam will illuminate a small fraction of the solid-angle field of view of the camera. Using only image data corresponding to pixels upon which light reflected by the swept beam is focused, identification of beam-illuminated portions of objects can be performed more simply than identification of everything in the full field of view. Therefore, data correlation of image data corresponding to structured-light illumination regions can be simplified with respect to full two-dimensional image correlations. Such full two-dimensional image correlation effectively can be reduced to a one-dimensional correlation using such structured-light techniques.

Figure 5A:
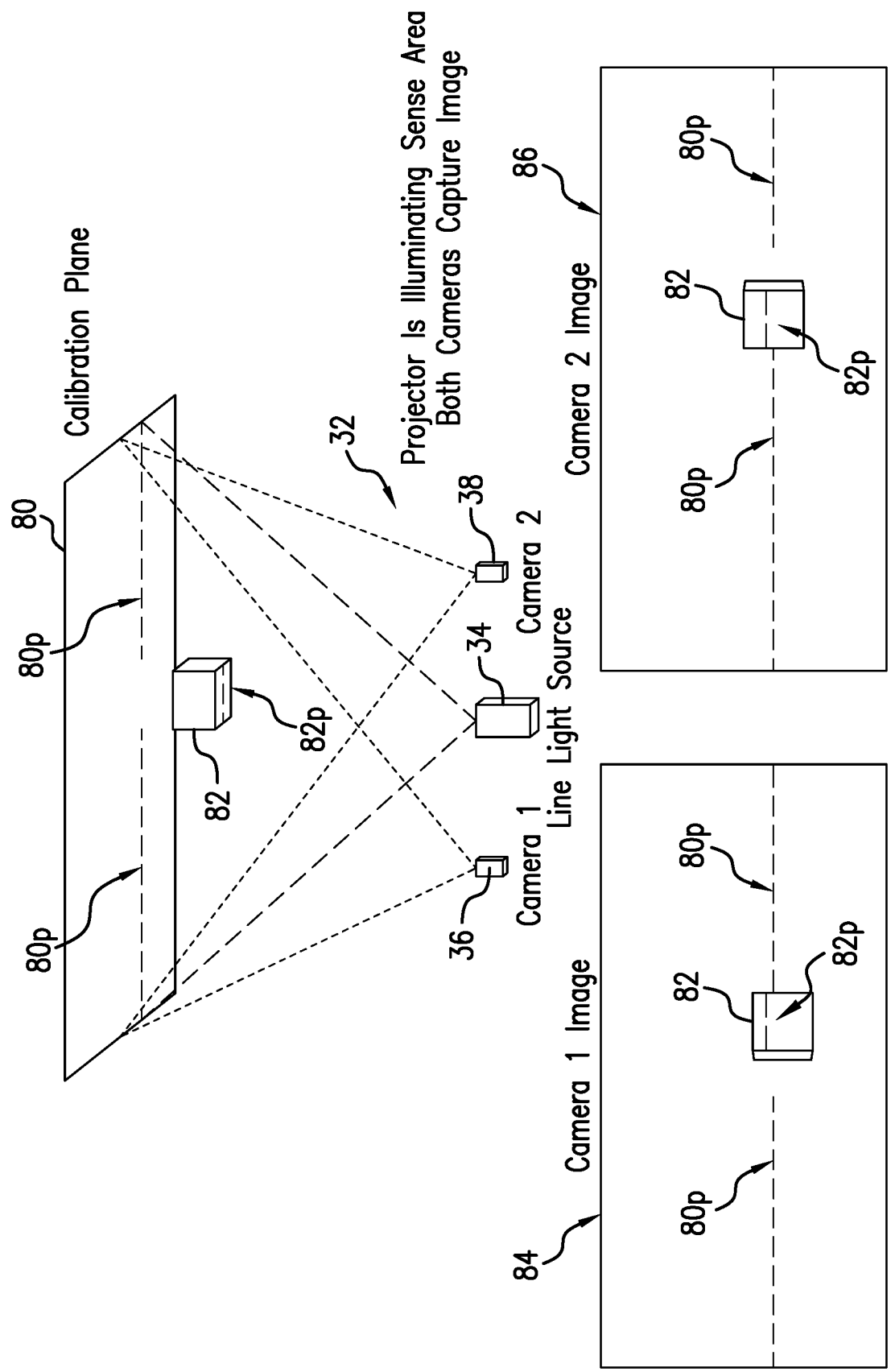
FIGS. 5A-5E are schematic diagrams depicting various configurations of structured-light illumination and ranging systems.

FIGS. 5A-5E are schematic diagrams depicting various configurations of structured-light illumination and ranging systems. In FIG. 5A, object ranging system 32 includes light projector 34, left-side camera 36, and right-side camera 38. Light projector 34 is depicted projecting spatially-patterned light onto a scene that includes calibration screen 80 and foreground object 82. The spatially-patterned light projected onto the scene illuminates spatially-patterned portion 80$p$ of calibration screen 80 and spatially-patterned portion 82$p$ of object 82. First image 84 depicts the scene as captured by left-side camera 36. First image 84 depicts spatially-patterned portion 80$p$ of calibration screen 80, foreground object 82, and spatially-patterned portion 82$p$ of foreground object 82. Second image 86 also depicts spatially-patterned portion 80$p$ of calibration screen 80, foreground object 82, and spatially-patterned portion 82$p$ of foreground object 82. Second image 86 depicts the scene as captured by right-side camera 36.

The various objects and spatially-illuminated portions 80$p$, 82 and 82$p$ thereof are captured at different image locations in first and second images 84 and 86. For example, there is a break in the otherwise contiguous spatially-patterned portions 80$p$ and 82$p$ of the scene in both first and second images 84 and 86. In image 84, which is captured by left-side camera 36, the break occurs just to the left of a location where foreground object 82 is imaged. In image 86, which is captured by right-side camera 38, the break occurs just to the right of a location where foreground object 82 is imaged. In each of these images, portions of the calibration screen, which are shadowed by foreground object 82 from the perspective of light projector 34, are visible to each of left- and right-side cameras 36 and 38. These captured shadow portions interrupt the spatially-patterned light projected onto the scene.

Such interruptions in the otherwise contiguous spatially-patterned portions of the scene can be indicative of a discontinuity of range, in this case caused by object 82 being in the foreground of calibration screen 80. The image locations at which the various structured-light portions are captured can be used to range the objects upon which the spatially-patterned light is projected. To determine image locations in both first and second images 84 and 86 that correspond to an object in the scene, a correlation of the pixel data can be performed. For example, a particular object in the scene, such as foreground object 82 can have a reflectivity pattern that is indicative of its shape or of its surface condition or material, for example.

Captured images of objects illuminated by spatially-patterned light can contain spatially-patterned image portions that are indicative of such a reflectivity pattern of foreground object 82. The correlation of the spatially-patterned portions of the image can result in identification of spatially-patterned portion 82$p$ of foreground object 82 as imaged in both first image 84 and as imaged in second image 86. After identifying these correlated image regions, ranging of the object to which the image regions pertain can be performed. Identification of the exact nature of the object corresponding to correlated image regions is not necessary. Thus, the correlated image regions could correspond to a parked aircraft or to any object within the field of view illuminated by the spatially-patterned light. Sophisticated object identification algorithms are not required to determine that an object is in the field of view (which can be performed by image correlation, for example) and a range to such an identified object can be subsequently determined (e.g., by triangulation, for example). Various spatial configuration can be used to locate light projector 34 and left- and right-side cameras 36 and 38. In the FIG. 5A depiction, left- and right-side cameras 36 and 38 are located symmetrically about light projector 34. Such a spatial configuration can result in a uniform performance across the field of view. Such uniform performance can be measured using metrics of resolution and/or range precision. In some embodiments, various non-symmetric spatial configurations can be used for various reasons, such as, for example, practical mounting configurations, etc.

Figure 5B:
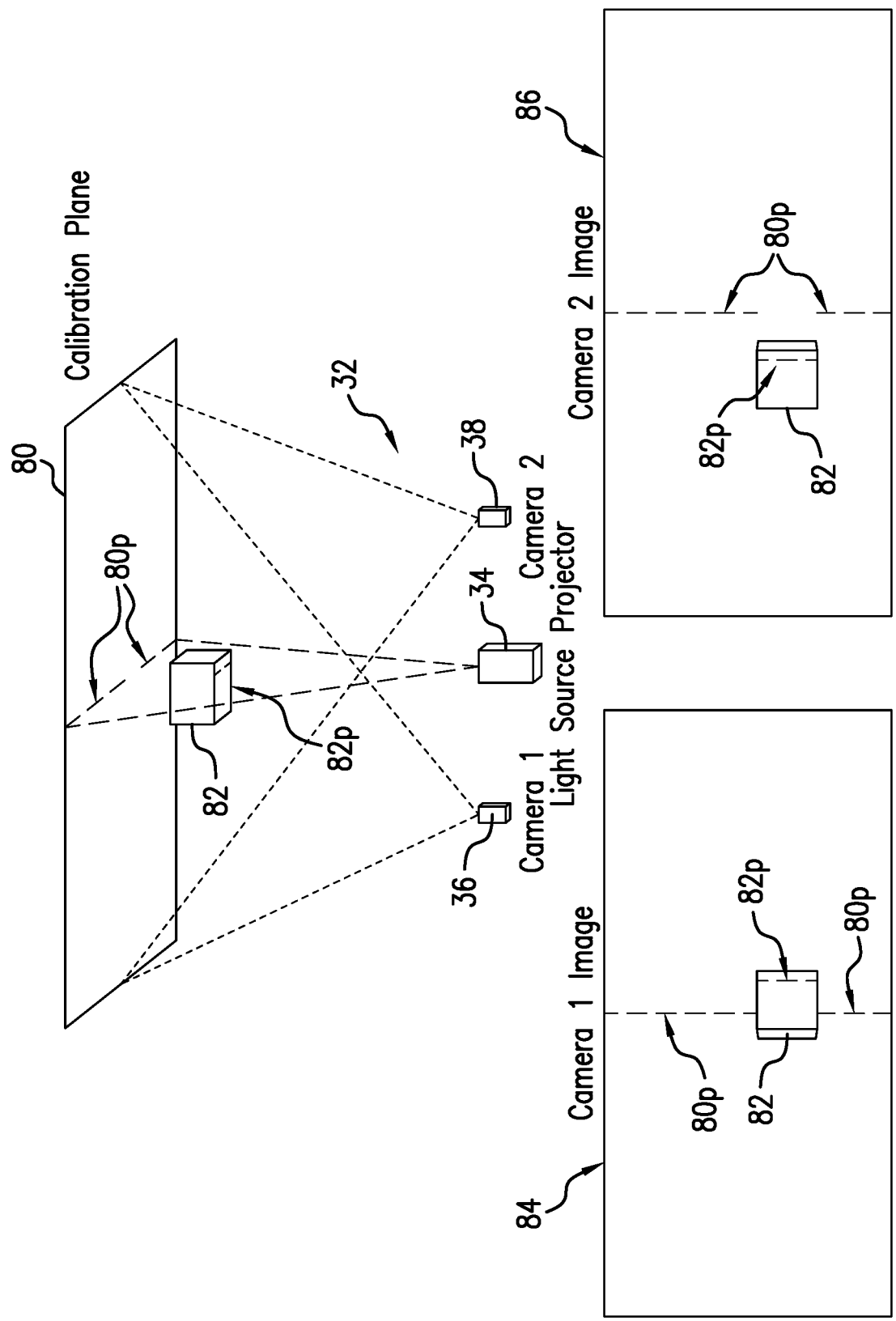

FIG. 5B depicts the same scene depicted in FIG. 5A, but with a different spatially-pattern light configuration projected onto the scene. In FIG. 5B, object ranging system 32 includes light projector 34, left-side camera 36, and right-side camera 38. Light projector 34 is depicted projecting spatially-patterned light onto a scene that includes calibration screen 80 and foreground object 82. The spatially-patterned light projected onto the scene illuminates spatially-patterned portion 80$p$ of calibration screen 80 and spatially-patterned portion 82$p$ of object 82. In the FIG. 5B depiction, however, spatially-patterned portions 80$p$ and 82$p$ have vertical orientations, whereas in FIG. 5A, spatially-patterned portions 80$p$ and 82$p$ had horizontal orientations. First image 84 depicts the scene as captured by left-side camera 36. First image 84 depicts spatially-patterned portion 80$p$ of calibration screen 80, foreground object 82, and spatially-patterned portion 82$p$ of foreground object 82. Second image 86 also depicts spatially-patterned portion 80$p$ of screen 80, foreground object 82, and spatially-patterned portion 82$p$ of foreground object 82.

The various objects and spatially-illuminated portions 80$p$, 82 and 82$p$ thereof are captured at different image locations in first and second images 84 and 86. For example, again there is a break in the otherwise contiguous spatially-patterned portions 80$p$ and 82$p$ of the scene in both first and second images 84 and 86. In image 84 of FIG. 5B, which is captured by left-side camera 36, spatially-patterned portion 82$p$ is translated to the right of spatially-patterned portion 80$p$. In image 86 of FIG. 5B, captured by right-side camera 38, spatially-patterned portion 82$p$ is translated to the left of spatially-patterned portion 80p. Again, these interruptions in the otherwise contiguous spatially-patterned portions of the scene can be indicative of a discontinuity of range, in this case caused by object 82 being in the foreground of calibration screen 80.

Figure 5C:
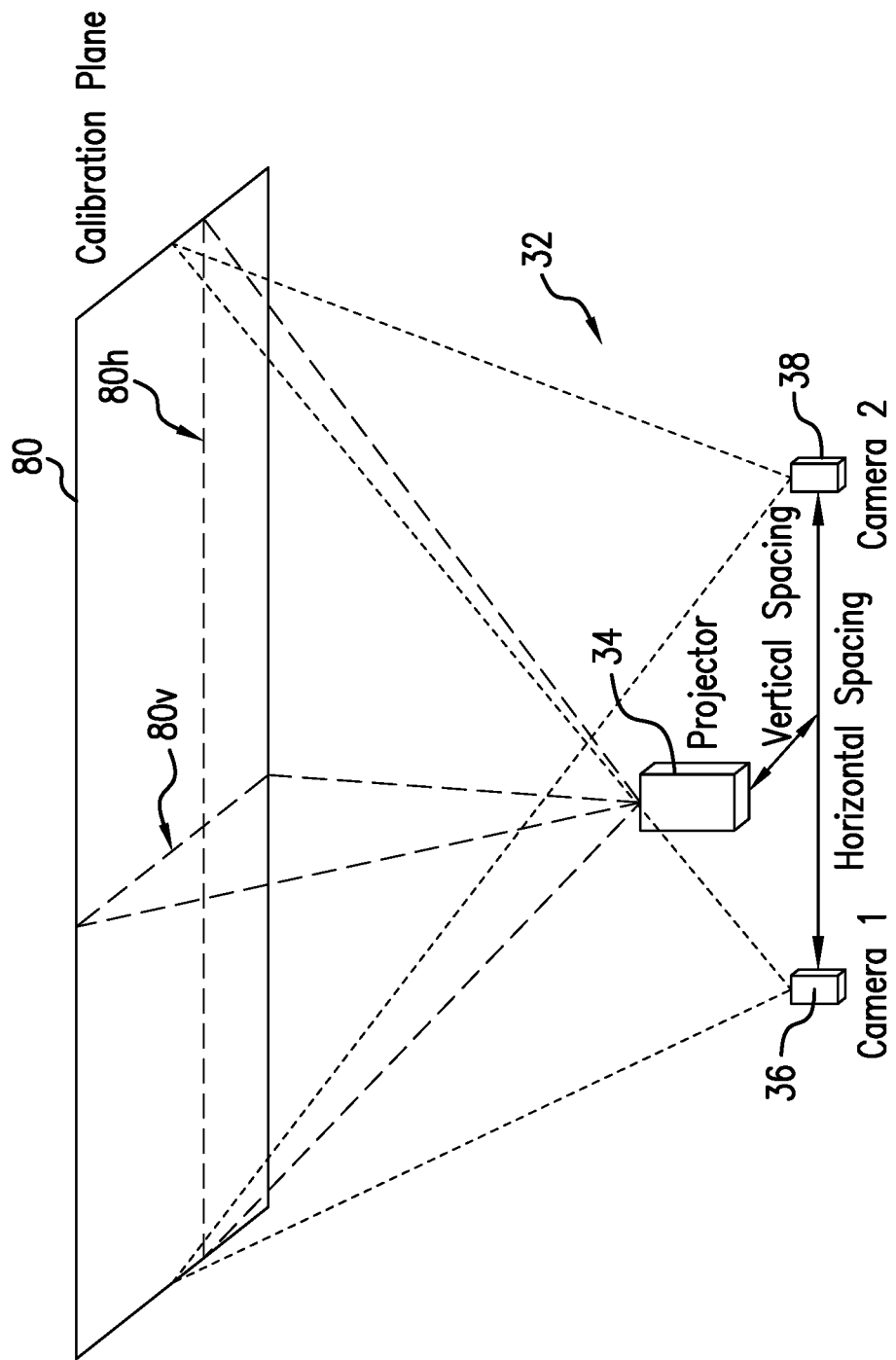

FIG. 5C depicts another configuration of light projector 34, left-side camera 36, and right-side camera 38. In the FIG. 5C depiction, light projector 34 is not aligned along the common transverse axis that left- and right-side cameras 36 and 38 are aligned along. Light projector 34 is depicted as projecting spatially-patterned light that has both vertical 80v and horizontal 80h segments onto calibration screen 80. Various other physical and optical arrangements can be used to perform ranging based on two simultaneously-captured images of objects illuminated by spatially-patterned light.

Figure 5D:
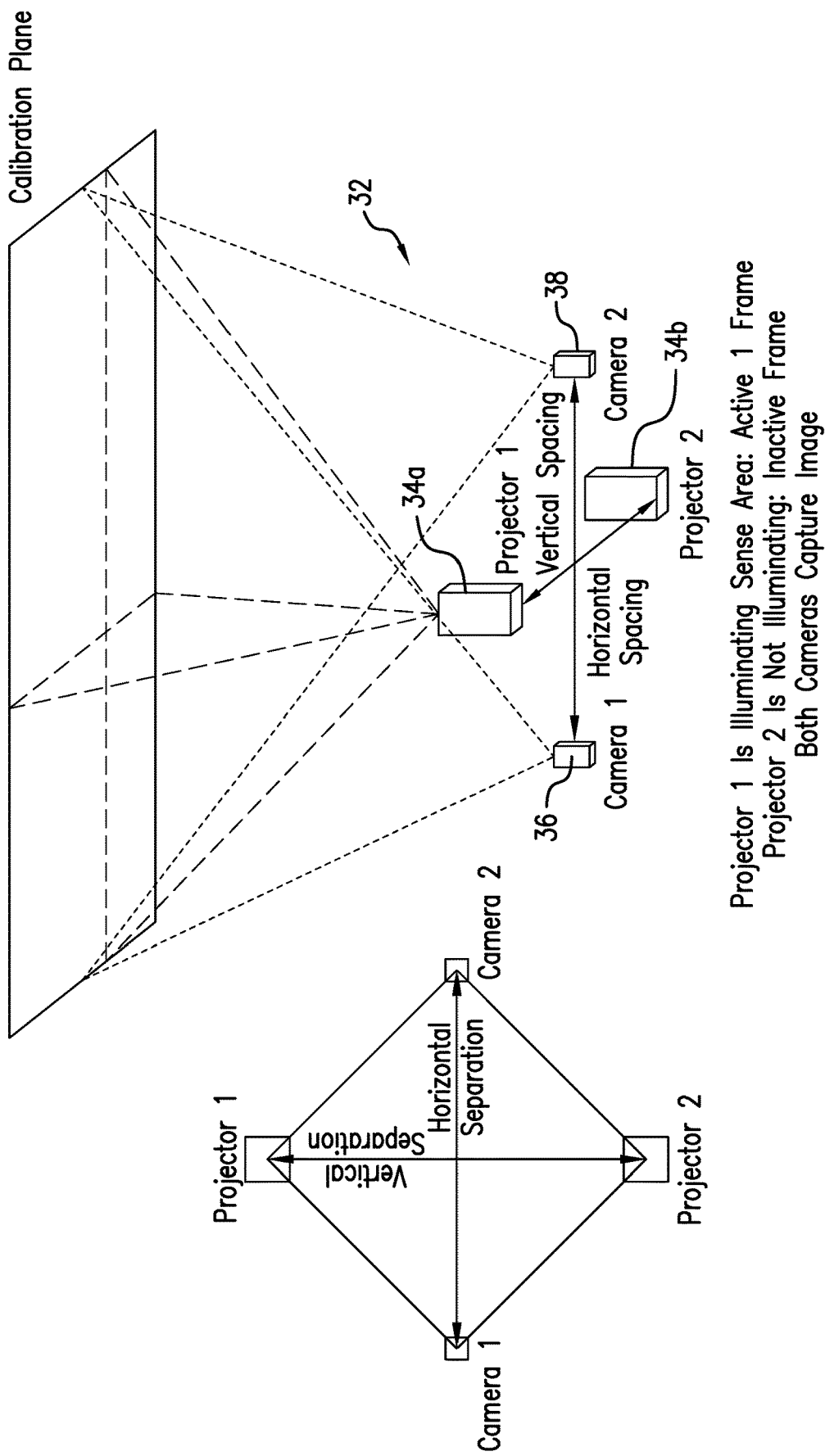

For example, FIG. 5D depicts object ranging system 32 having two light projectors 34a and 34b and two cameras 36 and 38. Cameras 36 and 38 can be configured to simultaneously capture images when light projector 34a and/or light projector 34b is projecting spatially-patterned light onto the scene, and/or when neither light projectors 34a and 34b are projecting spatially patterned light onto the scene. Two light projectors 34a and 34b can be used for various reasons. For example, each light projector can be configured to project light having a different spatial pattern. In some embodiments, each light projector can project light over a different solid angle. For example, light projector 34a might have a blind spot (e.g., because of an obscuring object) onto which light projector 34b is capable of projecting.

Figure 5E:
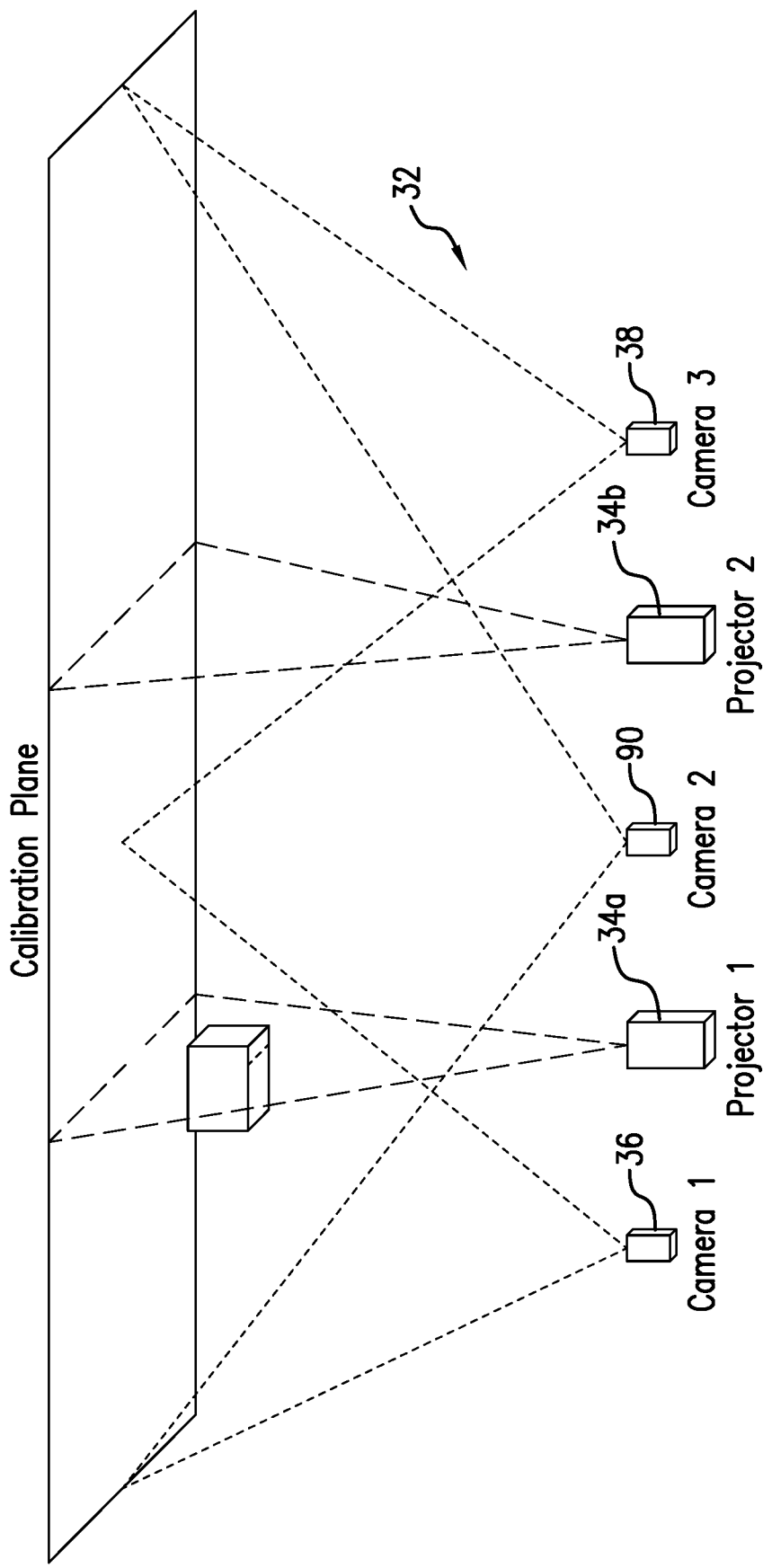

FIG. 5E depicts object ranging system 32 having two light projectors 34a and 34b and three cameras 36, 90, and 38. Any pair of cameras 36, 90 and 38 can be configured to simultaneously capture images when either, both, or neither of light projectors 34a and 34b is projecting spatially-patterned light onto the scene. Three cameras 36, 90 and 38 can be used for various reasons. For example, increased field of view coverage and/or increased precision (e.g., using redundancy) can be attained by using more than two cameras.

Figure 6:
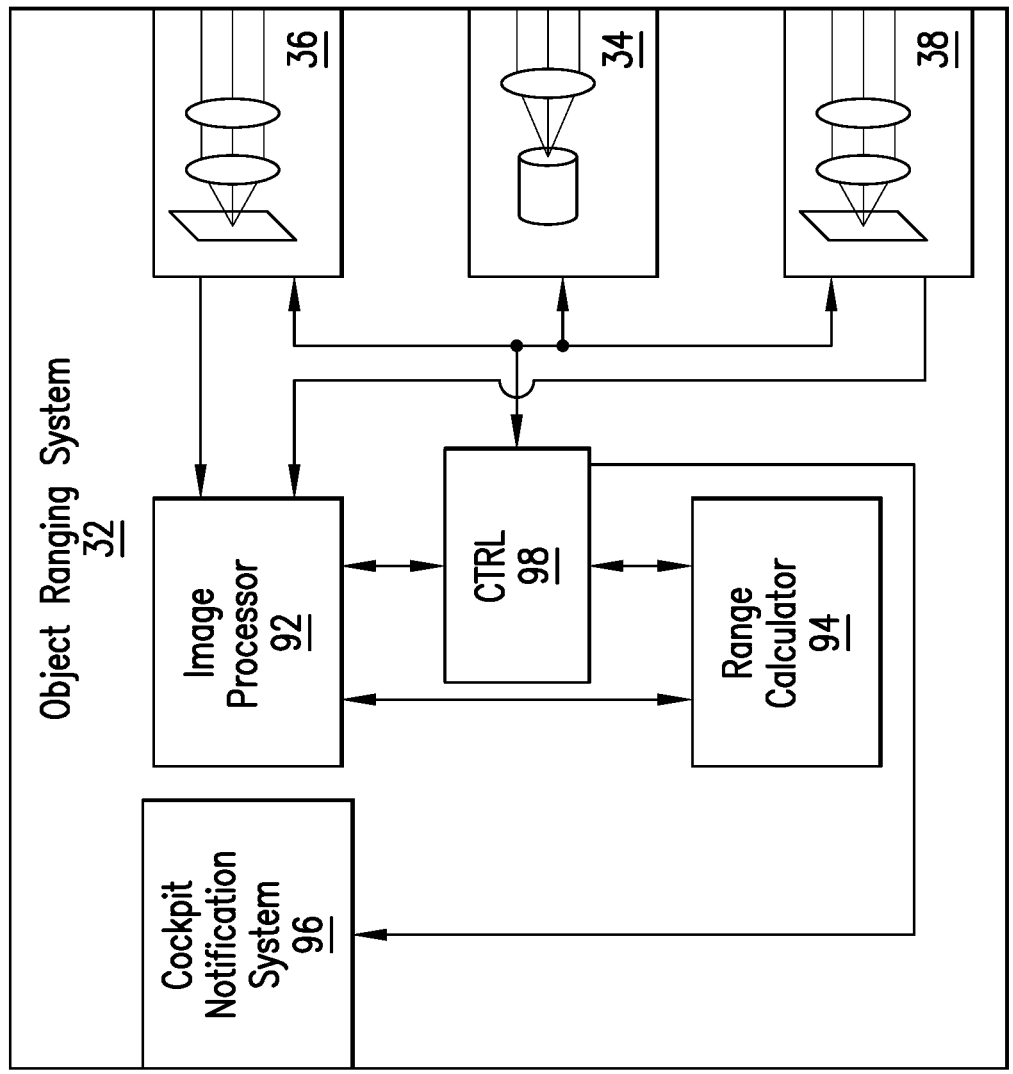
FIG. 6 is a block diagram of an embodiment of an object ranging system.

FIG. 6 is a block diagram of an embodiment of an object ranging system. In FIG. 6, object ranging system 32 includes light projector 34, cameras 36 and 38, image processor 92, range calculator 94, cockpit notification system 96, and controller 98. Light projector 34 is configured to be mounted at a projector location on an aircraft. Light projector 34 is further configured to project spatially-patterned light from light projector 34 onto a scene external to the aircraft, thereby illuminating a spatially-patterned portion of the scene including a spatially-patterned portion(s) of an object(s) within the scene.

Cameras 36 and 38 are configured to be mounted at two distinct camera locations on the aircraft. Such distinct camera locations are different from one another so that images captured by the cameras will be from different vantage points. Cameras 36 and 38 are further configured to receive light reflected from the scene. Each of cameras 36 and 38 is also configured to focus the received light onto a focal plane array comprising a plurality of light-sensitive pixels, thereby forming an image of the scene. The image can include pixel data generated by the plurality of light-sensitive pixels. Cameras 36 and 38 are further configured to simultaneously capture, when the spatially-patterned light is projected onto the scene, images of the scene from the two distinct camera locations on the aircraft.

In some embodiments, cameras 36 and 38 can be configured to simultaneously capture sub-regions of the fields of view, so as to track a ranged object, for example. In some embodiments, light projector 34 can be coordinated to project spatially-patterned light only on the sub-regions captured by cameras 36 and 38. In some embodiments, various sub-regions can be captured between full field of view capture events. For example, objects first can be ranged using a full field of view operation, followed by various sub-region ranging corresponding to the objects ranged within a predetermined distance of the aircraft. In some embodiments, more than two cameras can be used for ranging. For example, two cameras can be mounted on each side of the aircraft—two right-side cameras and two left-side cameras. In such an embodiment, the two right-side cameras can be configured to range objects on the right side of the aircraft, and the two left-side cameras can be configured to range objects on the left side of the aircraft, for example.

Image processor 92 receives inputs from cameras 36 and 38. Image processor 92 is configured to identify pixel coordinates corresponding to a subset of the plurality of light-sensitive pixels upon which the spatially-patterned light projected by light projector 34 and reflected from the spatially-patterned portion of the scene is focused. For example, image processor 92 can be configured to identify first and second regions of the first and second images, onto which the spatially-patterned light is focused, respectively. Image processor 92 is further configured to correlate the identified first and second regions with one another so as to determine pixel coordinates corresponding to specific objects in the scene.

Range calculator 94 is configured to calculate range to the specific objects in the scene corresponding to the correlated first and second image regions. Range calculator 94 can calculate range using triangulation based on the determined first and second pixel-coordinates corresponding to the correlated first and second image regions, as well as the first and second distinct camera locations from which the first and second images are simultaneously captured, respectively.

Controller 98 generates commands that control the operation of light projector 34 and cameras 36 and 38. Controller 98 outputs alarms ranges and images to cockpit notification system 96.

Figure 7:
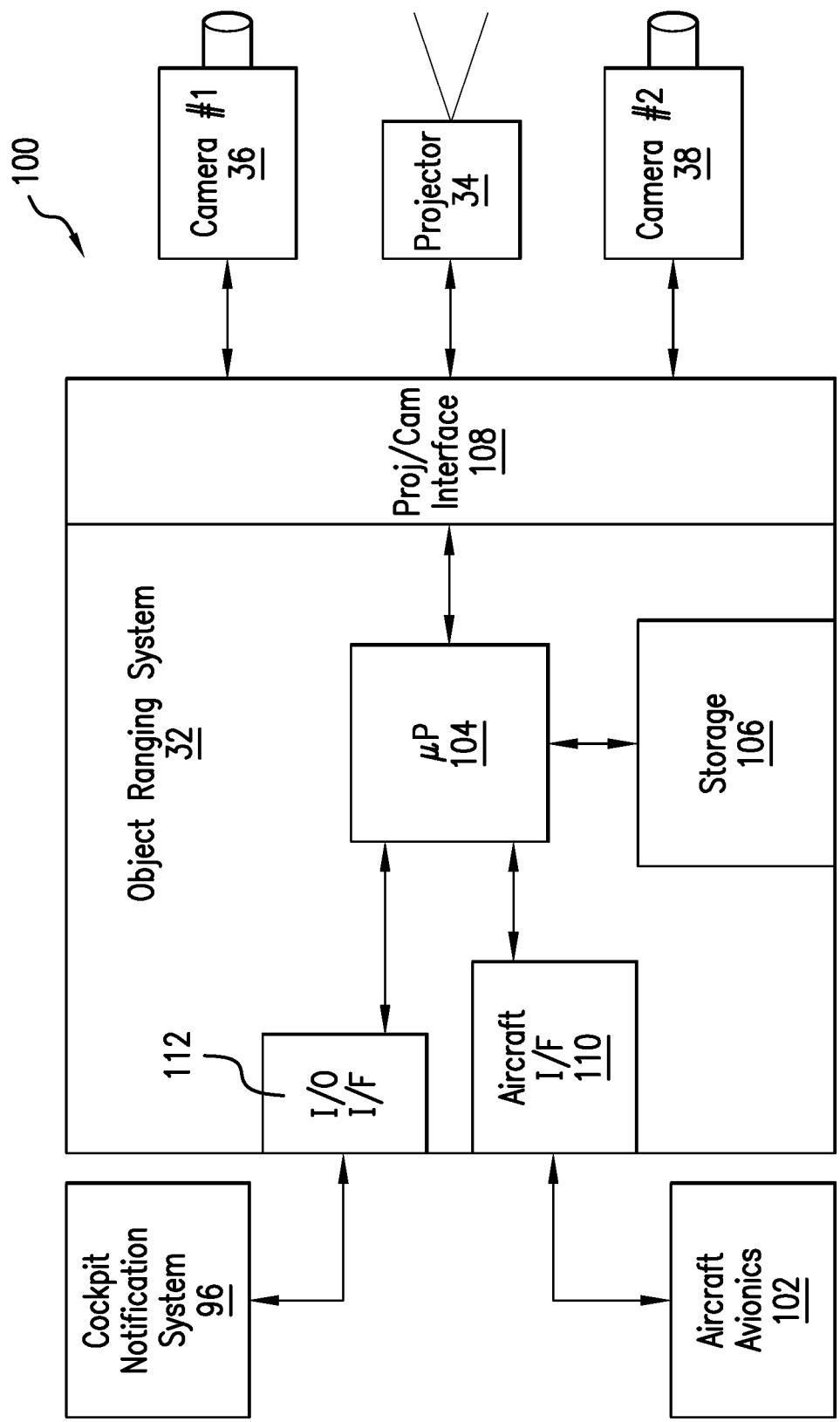
FIG. 7 is a block diagram of an embodiment of an object ranging system.

FIG. 7 is a block diagram of an embodiment of an object ranging system. In FIG. 7, aircraft collision alerting system 100 includes light projector 34, cameras 36 and 38, object ranging system 32, aircraft avionics 102 and cockpit notification system 96. Object ranging system 32 includes processor(s) 104, storage device(s) 106, Projector/camera interface 108, Aircraft interface 110, and input/output interface 112. Processor(s) 104 can receive program instructions from storage device(s) 106. Processor(s) 104 can be configured to generate control signals for each of light projector 34, cameras 36 and 38, object ranging system 32, aircraft avionics 102 and cockpit notification system 96. For example, processor(s) 104 can be configured to receive, from cameras 36 and 38, simultaneously-captured images. Processor(s) 104 can perform image processing algorithms upon the received simultaneously-captured images, so as to determine regions of each that correlate one to another. Processor(s) 104 can be configured to coordinate activities of projector 34 and cameras 36 and 38. Processor(s) 104 can be further configured to communicate with both aircraft avionics 102 and with cockpit notification system 96.

Processor(s) 104, in some embodiments, can be configured to implement functionality and/or process instructions for execution within object ranging system 32. For instance, processor(s) 104 can be capable of processing instructions stored in storage device(s) 106. Examples of processor(s)

104 can include any one or more of a microprocessor, a controller, a digital signal processor(s) (DSP), an application specific integrated circuit (ASIC), a field-programmable gate array (FPGA), or other equivalent discrete or integrated logic circuitry.

Storage device(s) 106 can be configured to store information within object ranging system 32 during operation. Storage device(s) 106, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 106 is a temporary memory, meaning that a primary purpose of storage device(s) 106 is not long-term storage. Storage device(s) 106, in some examples, is described as volatile memory, meaning that storage device(s) 106 do not maintain stored contents when power to object ranging system 32 is turned off. Examples of volatile memories can include random access memories (RAM), dynamic random access memories (DRAM), static random access memories (SRAM), and other forms of volatile memories. In some examples, storage device(s) 106 is used to store program instructions for execution by processor(s) 104. Storage device(s) 106, in one example, is used by software or applications running on object ranging system 32 (e.g., a software program implementing long-range cloud conditions detection) to temporarily store information during program execution.

Storage device(s) 106, in some examples, can also include one or more computer-readable storage media. Storage device(s) 106 can be configured to store larger amounts of information than volatile memory. Storage device(s) 106 can further be configured for long-term storage of information. In some examples, storage device(s) 106 include non-volatile storage elements. Examples of such non-volatile storage elements can include magnetic hard discs, optical discs, flash memories, or forms of electrically programmable memories (EPROM) or electrically erasable and programmable (EEPROM) memories.

Projector/camera interface 108 can be used to communicate information between object ranging system 32, light projector 34 and/or cameras 36 and 38. In some embodiments, such information can include commands for light projector 34 and/or cameras 36 and 38. Such information can include images captured by cameras 36 and 38. In some embodiments, such information can include data processed by object ranging system 32, such as, for example, range data. Projector/camera interface 108 can also include a communications module. Projector/camera interface 108, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Aircraft interface 110 can be used to communicate information between object ranging system 32 and aircraft avionics 102. Processor(s) 104 is in communication with cockpit aircraft avionics 102 via aircraft interface 110. Aircraft avionics 102 can provide processor(s) 104 with metrics indicative of the aircraft's location, orientation, speed, etc. Processor(s) 104 can provide notification system 96 with signals indicative of risk of collision with an object(s) external to the aircraft, based on received metrics indicative of the aircraft's location, orientation, speed, etc.

Input/output interface 112, in some examples, is configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus. Input/output interface can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for ranging an object in a scene. The system includes a light projector configured to be mounted at a projector location. The light projector also is configured to project spatially-patterned light onto the scene, thereby illuminating a spatially-patterned portion of the scene including a spatially-patterned portion of the object in the scene. The system includes first and second cameras configured to be mounted at first and second distinct camera locations. The first and second cameras are further configured to simultaneously capture, when the spatially-patterned light is projected onto the scene, first and second images of the scene from the first and second distinct camera locations, respectively, thereby focusing the spatially-patterned portion of the object onto pixel(s) having first pixel coordinates in the first image and onto pixel(s) having second pixel coordinates in the second image. The system includes an image processor configured to identify first and second regions of the first and second images, onto which the spatially-patterned light is focused, respectively. The image processor is further configured to correlate the identified first and second regions with one another so as to determine the first and second pixel coordinates corresponding to the spatially-patterned portion of the object. The system also includes a range calculator configured to calculate range to the object using triangulation based on the determined first and second pixel-coordinates and the first and second distinct camera locations from which the first and second images are simultaneously captured.

The system of the preceding paragraph can optionally include, additionally and/or alternatively, any one or more of the following features, configurations and/or additional components:

A further embodiment of the foregoing system, wherein the range calculated by the range calculator is a first range. The range calculator can be further configured to calculate a second range to the object using triangulation based on the determined first pixel-coordinates, the first distinct camera location from which the first image is captured, and the projection location from which the spatially-patterned light is projected onto the object.

A further embodiment of any of the foregoing systems, wherein the range calculator can be further configured to calculate a third range to the object using triangulation based on the determined second pixel-coordinates, the second distinct camera location from which the second image is captured, and the projection location from which the spatially-patterned light is projected onto the object.

A further embodiment of any of the foregoing systems, wherein distance between the system and the object can be calculated using the calculated first, second and third ranges.

A further embodiment of any of the foregoing systems, wherein the first and second cameras can be further configured to simultaneously capture, when the spatially-patterned light is not projected onto the scene, third and fourth images of the scene from the first and second distinct camera locations, respectively.

A further embodiment of any of the foregoing systems, wherein the image processor can be further configured to calculate a first difference image, based on a difference between the first and third images captured by the first camera and a second difference image, based on a difference between the second and fourth images captured by the second camera.

A further embodiment of any of the foregoing systems, further including a cockpit notification system configured to generate an alert signal if the calculated range to the object is within a collision zone or on a collision trajectory.

A further embodiment of any of the foregoing systems, wherein the cockpit notification system can include a display device configured to display an image of the scene annotated with the calculated position values and range data.

Some embodiments relate to a method for ranging an object in a scene. The method includes projecting spatially-patterned light onto the scene, thereby illuminating a spatially-patterned portion of the scene including a spatially-patterned portion of the object in the scene. Then, two images of the scene from two distinct vantage points are simultaneously captured when the spatially-patterned light is projected upon the scene, thereby imaging the spatially-patterned portion of the object at first pixel coordinates in a first of the two images and at second pixel coordinates in a second of the two images. The first and second regions upon which the spatially-patterned light is imaged in the first and second images, respectively are identified. The first and second regions are correlated with one another so as to determine the first and second pixel coordinates corresponding to the spatially-patterned portion of the object. Range to the object is calculated using triangulation based on the determined first and second pixel-coordinates and the two distinct vantage points from which the two images are simultaneously captured. An output signal indicative of the calculated range is then generated The method of the preceding paragraph can optionally include, additionally and/or alternatively, any one or more of the following features, configurations and/or additional components:

A further embodiment of the foregoing method can further include calculating a third range to the object using triangulation based on the determined second pixel-coordinates, a second of the two distinct vantage points from which the second image is captured, and the projection location from which the spatially-patterned light is projected onto the object.

A further embodiment of any of the foregoing methods can further include calculating a third range to the object using triangulation based on the determined second pixel-coordinates, a second of the two distinct vantage points from which the second image is captured, and the projection location from which the spatially-patterned light is projected onto the object.

A further embodiment of any of the foregoing methods can further include calculating distance between the object and the projector location and/or the distinct vantage points using the calculated first, second and third ranges.

A further embodiment of any of the foregoing methods can further include simultaneously capturing, when the spatially-patterned light is not projected upon the scene, two images of the scene from the two distinct vantage points.

A further embodiment of any of the foregoing methods can further include calculating, for each of the two vantage points, a difference image, based on the difference between the image captured when the light projector is projecting the spatially-patterned light onto the scene, and the image captured when the light projector is not projecting the spatially-patterned light onto the scene.

A further embodiment of any of the foregoing methods can further include activating an audible alarm when the calculated range to the object is within a collision zone or on a collision trajectory.

A further embodiment of any of the foregoing methods can further include displaying an image of the scene annotated with the calculated range.

Some embodiments relate to a system for ranging an object in a scene. The system includes a light projector configured to be mounted at a projector location. The light projector is further configured to project spatially-patterned light onto the scene, thereby illuminating a spatially-patterned portion of the scene including a spatially-patterned portion of the object in the scene. The system includes first and second cameras configured to be mounted at first and second distinct camera locations. The first and second cameras are further configured to simultaneously capture, when the spatially-patterned light is projected onto the scene, first and second images of the scene from the first and second distinct camera locations, respectively, thereby imaging the spatially-patterned portion of the object at first pixel coordinates in the first image and at second pixel coordinates in the second image. The system includes one or more processors and computer-readable memory. The computer-readable memory is encoded with instructions that, when executed by the one or more processors, cause the system to identify first and second regions upon which the spatially-patterned light is imaged in the first and second images, respectively. The computer-readable memory is further encoded with instructions that, when executed by the one or more processors, cause the system to correlate the first and second regions with one another so as to determine the first and second pixel coordinates corresponding to the spatially-patterned portion of the object. The computer-readable memory is further encoded with instructions that, when executed by the one or more processors, cause the system to calculate range to the object using triangulation based on the determined first and second pixel-coordinates and the two distinct vantage points from which the two images are simultaneously captured.

The system of the preceding paragraph can optionally include, additionally and/or alternatively, any one or more of the following features, configurations and/or additional components:

A further embodiment of the foregoing system, wherein the computer-readable memory can be further encoded with instructions that, when executed by the one or more processors, cause the system to calculate a second range to the object using triangulation based on the determined first pixel-coordinates, a first of the two distinct camera locations from which the first image is captured, and the projection location from which the spatially-patterned light is projected onto the object.

A further embodiment of any of the foregoing system, wherein the computer-readable memory can be further encoded with instructions that, when executed by the one or more processors, cause the system to calculate a third range to the object using triangulation based on the determined second pixel-coordinates, a second of the two distinct camera locations from which the second image is captured, and the projection location from which the spatially-patterned light is projected onto the object.

A further embodiment of any of the foregoing system, wherein the computer-readable memory can be further encoded with instructions that, when executed by the one or more processors, cause the system to calculate distance between the object and the system using the calculated first, second and third ranges.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for ranging an object in a scene external to a taxiing aircraft, the system comprising:
    a light projector configured to be mounted on the taxiing aircraft at a projector location and further configured to project spatially-patterned infrared light onto the scene, thereby illuminating a spatially-patterned portion of the scene including a spatially-patterned portion of the object in the scene;
    first and second cameras configured to be mounted on the taxiing aircraft at first and second distinct camera locations, and further configured to simultaneously capture, when the spatially-patterned infrared light is projected onto the scene, first and second images of the scene from the first and second distinct camera locations, respectively, thereby focusing the spatially-patterned portion of the object onto pixel(s) having first pixel coordinates in the first image and onto pixel(s) having second pixel coordinates in the second image;
    an image processor configured to identify first and second regions of the first and second images, onto which the spatially-patterned infrared light is focused, respectively, and further configured to correlate the identified first and second regions with one another so as to determine the first and second pixel coordinates corresponding to the spatially-patterned portion of the object; and
    a range calculator configured to calculate range to the object using triangulation based on the determined first and second pixel-coordinates and the first and second distinct camera locations from which the first and second images are simultaneously captured.

2. The system of claim 1, wherein the range calculated by the range calculator is a first range, the range calculator further configured to calculate a second range to the object using triangulation based on the determined first pixel-coordinates, the first distinct camera location from which the first image is captured, and the projection location from which the spatially-patterned infrared light is projected onto the object.

3. The system of claim 2, wherein the range calculator is further configured to calculate a third range to the object using triangulation based on the determined second pixel-coordinates, the second distinct camera location from which the second image is captured, and the projection location from which the spatially-patterned infrared light is projected onto the object.

4. The system of claim 3, wherein distance between the system and the object is calculated using the calculated first, second and third ranges.

5. The system of claim 1, wherein the first and second cameras are further configured to simultaneously capture, when the spatially-patterned infrared light is not projected onto the scene, third and fourth images of the scene from the first and second distinct camera locations, respectively.

6. The system of claim 5, wherein the image processor is further configured to calculate a first difference image, based on a difference between the first and third images captured by the first camera and a second difference image, based on a difference between the second and fourth images captured by the second camera.

7. The system of claim 1, further comprising a cockpit notification system configured to generate an alert signal if the calculated range to the object is within a collision zone or on a collision trajectory.

8. The system of claim 7, wherein the cockpit notification system includes a display device configured to display an image of the scene annotated with the calculated position values and range data.

9. A method for ranging an object in a scene external to a taxiing aircraft, the method comprising:
    projecting, from a projection location of the taxiing aircraft, spatially-patterned infrared light onto the scene, thereby illuminating a spatially-patterned portion of the scene including a spatially-patterned portion of the object in the scene;
    simultaneously capturing, when the spatially-patterned infrared light is projected upon the scene, two images of the scene from two distinct camera locations of the taxiing aircraft, thereby imaging the spatially-patterned portion of the object at first pixel coordinates in a first of the two images and at second pixel coordinates in a second of the two images;
    identifying first and second regions upon which the spatially-patterned infrared light is imaged in the first and second images, respectively;

correlating the first and second regions with one another so as to determine the first and second pixel coordinates corresponding to the spatially-patterned portion of the object;

calculating range to the object using triangulation based on the determined first and second pixel-coordinates and the two distinct camera locations from which the two images are simultaneously captured; and generating an output signal indicative of the calculated range.

10. The method of claim 9, wherein the calculated range is a first range, the method further comprising:

calculating a second range to the object using triangulation based on the determined first pixel-coordinates, a first of the two distinct camera locations from which the first image is captured, and the projection location from which the spatially-patterned infrared light is projected onto the object.

11. The method of claim 10, further comprising:

calculating a third range to the object using triangulation based on the determined second pixel-coordinates, a second of the two distinct camera locations from which the second image is captured, and the projection location from which the spatially-patterned infrared light is projected onto the object.

12. The method of claim 11, further comprising:

calculating distance between the object and the projector location and/or the distinct vantage points using the calculated first, second and third ranges.

13. The method of claim 9, further comprising:

simultaneously capturing, when the spatially-patterned infrared light is not projected upon the scene, two images of the scene from the two distinct vantage points.

14. The method of claim 13, further comprising:

calculating, for each of the two camera locations, a difference image, based on the difference between the image captured when the light projector is projecting the spatially-patterned infrared light onto the scene, and the image captured when the light projector is not projecting the spatially-patterned infrared light onto the scene.

15. The method of claim 9, further comprising:

activating an audible alarm when the calculated range to the object is within a collision zone or on a collision trajectory.

16. The method of claim 9, further comprising:

displaying an image of the scene annotated with the calculated range.

17. A system for ranging an object in a scene external to a taxiing aircraft, the system comprising:

a light projector configured to be mounted on the taxiing aircraft at a projector location, and further configured to project spatially-patterned infrared light onto the scene, thereby illuminating a spatially-patterned portion of the scene including a spatially-patterned portion of the object in the scene;

first and second cameras configured to be mounted on the taxiing aircraft at first and second distinct camera locations, and further configured to simultaneously capture, when the spatially-patterned infrared light is projected onto the scene, first and second images of the scene from the first and second distinct camera locations, respectively, thereby imaging the spatially-patterned portion of the object at first pixel coordinates in the first image and at second pixel coordinates in the second image;

one or more processors; and computer-readable memory encoded with instructions that, when executed by the one or more processors, cause the system to:

identify first and second regions upon which the spatially-patterned infrared light is imaged in the first and second images, respectively;

correlate the first and second regions with one another so as to determine the first and second pixel coordinates corresponding to the spatially-patterned portion of the object; and calculate range to the object using triangulation based on the determined first and second pixel-coordinates and the two distinct camera locations from which the two images are simultaneously captured.

18. The system of claim 17, wherein the computer-readable memory encoded with instructions that, when executed by the one or more processors, cause the system to:

calculate a second range to the object using triangulation based on the determined first pixel-coordinates, a first of the two distinct camera locations from which the first image is captured, and the first or second projection projector location from which the spatially-patterned infrared light is projected onto the object.

19. The system of claim 18, wherein the computer-readable memory encoded with instructions that, when executed by the one or more processors, cause the system to:

calculate a third range to the object using triangulation based on the determined second pixel-coordinates, a second of the two distinct camera locations from which the second image is captured, and the projector location from which the spatially-patterned infrared light is projected onto the object.

20. The system of claim 19, wherein the computer-readable memory encoded with instructions that, when executed by the one or more processors, cause the system to:

calculate distance between the object and the system using the calculated first, second and third ranges.

* * * * *

UNITED STATES PATENT AND TRADEMARK OFFICE
CERTIFICATE OF CORRECTION

PATENT NO. : 10,818,024 B2
APPLICATION NO. : 15/936089
DATED : October 27, 2020
INVENTOR(S) : Robert Rutkiewicz, Todd Anthony Ell and Joseph T. Pesik Page 1 of 1

It is certified that error appears in the above-identified patent and that said Letters Patent is hereby corrected as shown below:

In the Claims

Column 20, Line 36-37 Claim 18:
Delete "the first or second projection projector"
Insert -- projector --

Signed and Sealed this
First Day of December, 2020

Andrei Iancu
*Director of the United States Patent and Trademark Office*